United States Patent
Lei et al.

(10) Patent No.: US 11,568,432 B2
(45) Date of Patent: Jan. 31, 2023

(54) AUTO CLUSTERING PREDICTION MODELS

(71) Applicant: ORACLE INTERNATIONAL CORPORATION, Redwood Shores, CA (US)

(72) Inventors: Ming Lei, Ellicott City, MD (US); Catalin Popescu, Atlanta, GA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 49 days.

(21) Appl. No.: 16/856,267

(22) Filed: Apr. 23, 2020

(65) Prior Publication Data
US 2021/0334830 A1    Oct. 28, 2021

(51) Int. Cl.
*G06Q 30/02*    (2012.01)
*G06K 9/62*    (2022.01)

(52) U.S. Cl.
CPC ....... *G06Q 30/0204* (2013.01); *G06K 9/6223* (2013.01); *G06Q 30/0206* (2013.01)

(58) Field of Classification Search
None
See application file for complete search history.

(56) References Cited

U.S. PATENT DOCUMENTS

| | | | |
|---|---|---|---|
| 8,738,421 B1* | 5/2014 | Ali | G06Q 30/0202 705/7.29 |
| 2011/0004510 A1* | 1/2011 | Bateni | G06Q 30/0201 705/7.29 |
| 2015/0100384 A1* | 4/2015 | Ettl | G06Q 30/0206 705/7.35 |

(Continued)

FOREIGN PATENT DOCUMENTS

| | | | | |
|---|---|---|---|---|
| WO | WO-2018170593 A1 * | 9/2018 | ........... | G06K 9/6256 |
| WO | 2020046497 A1 | 3/2020 | | |
| WO | WO-2020074206 A1 * | 4/2020 | ....... | G06Q 10/06313 |

OTHER PUBLICATIONS

Kochak, Ashvin, and Suman Sharma. "Demand forecasting using neural network for supply chain management." International journal of mechanical engineering and robotics research 4.1 (2015): 96-104. (Year: 2015).*

Carbonneau, Real, Kevin Laframboise, and Rustam Vahidov. "Application of machine learning techniques for supply chain demand forecasting." European Journal of Operational Research 184.3 (2008): 1140-1154. (Year: 2008).*

(Continued)

*Primary Examiner* — Thomas L Mansfield
(74) *Attorney, Agent, or Firm* — Potomac Law Group, PLLC (57) ABSTRACT

Embodiments predict future demand for a first product by receiving historical sales data for an aggregate products/locations level, the historical sales data including a plurality of sales data points, including sales data points for the first product at each of a plurality of locations. Embodiments extract a plurality of different types of features related to sales of each of the products and generate a plurality of clusters of sales data points based on the plurality of different types of features. Embodiments train each of the clusters to generate a plurality of trained cluster models including promotion effects per cluster. For a particular time period, a particular location and the first product, embodiments identify the features for the time period and map to one of the trained cluster models to fetch the promotion effects for the time period. Embodiments then use the promotion effects to forecast demand for the first product.

20 Claims, 6 Drawing Sheets

(56) References Cited

U.S. PATENT DOCUMENTS

| | | | |
|---|---|---|---|
| 2015/0120381 A1* | 4/2015 | Popescu | G06Q 30/0202 |
| | | | 705/7.31 |
| 2015/0134413 A1* | 5/2015 | Deshpande | G06Q 30/0202 |
| | | | 705/7.31 |
| 2015/0170167 A1* | 6/2015 | Lei | G06Q 30/0202 |
| | | | 705/7.31 |
| 2015/0235239 A1 | 8/2015 | Chowdhary et al. | |
| 2016/0171540 A1* | 6/2016 | Mangipudi | G06Q 30/0255 |
| | | | 705/14.53 |
| 2016/0239855 A1 | 8/2016 | Feng et al. | |
| 2016/0247172 A1 | 8/2016 | Lei et al. | |
| 2016/0292324 A1 | 10/2016 | Leonard et al. | |
| 2017/0154349 A1 | 6/2017 | Popescu et al. | |
| 2017/0364614 A1* | 12/2017 | Freeman | G06F 30/20 |
| 2018/0060765 A1* | 3/2018 | Hance | G06Q 10/043 |
| 2018/0068255 A1* | 3/2018 | Hance | G06Q 10/0838 |
| 2018/0365714 A1* | 12/2018 | Lei | G06N 20/10 |
| 2019/0130425 A1 | 5/2019 | Lei et al. | |
| 2020/0074373 A1* | 3/2020 | Adato | G06K 9/00624 |
| 2020/0074485 A1* | 3/2020 | Popescu | G06Q 30/0202 |
| 2020/0104771 A1 | 4/2020 | Popescu et al. | |
| 2020/0126016 A1* | 4/2020 | Kannan | G06Q 30/0283 |

OTHER PUBLICATIONS

Triana, Demand Forecast for Short Life Cycle Products, Dec. 2012.
Artley, Oracle Retail Demand Forecasting User Guide, Release 13.2, Jul. 2010.
Lopienski, "What is Demand Forecasting? Importance and Benefits of Forecasting Customer Demand," ShipBob, 2019, Retrieved from https://www.shipbob.com/blog/demand-forecasting/, pp. 1-13.

* cited by examiner

Fig. 6

AUTO CLUSTERING PREDICTION MODELS

FIELD

One embodiment is directed generally to prediction models, and in particular to prediction models generated from the auto clustering of data points.

BACKGROUND INFORMATION

Machine learning algorithms build a mathematical model based on sample data, known as "training data", in order to make predictions or decisions without being explicitly programmed to perform the task. Meanwhile, data mining focuses on the discovery of previously unknown properties in the data. Both machine learning and data mining can be used to analyze a large amount of data, and use the analysis to make future predictions.

Predictions using machine learning and data mining are needed in the retail industry, where retailers need to predict their demand in the future to better manage their inventory or promotion/markdown planning. Retailers may engage in many types of promotions to boost their sales. To generate an accurate forecast, a retailer has to consider all factors/features which could impact the demand, such as promotions, price, seasonality, weather, etc.

In general, sales forecast systems encounter problems in producing a week-by-week forecast of sales units for retail items. The sales of retail items in a given week is affected by many factors, such as seasonal factors, whether a discount has been applied to a retail item during the week, and at what point in the lifecycle of a merchandise the week falls. One common approach to forecasting weekly sales units involves building a "causal demand model" for retail items. This demand model is a mathematical model that describes weekly sales units in terms of factors such as the ones listed above. The factors are known as the "demand variables" or "demand features" that form a demand model.

The demand model specifies mathematically how the demand variables affect sales units. For example, if the amount of discount is a demand variable, historical data may show that a 50% price cut resulted in a 4-fold increase in sales units (i.e., related to price elasticity). In this example, the demand variable is a 50% price cut and the historical sales data is the 4-fold increase in sales. In order for the causal demand model to be of use in forecasting sales units, it is necessary to determine the relationship of the demand variable (50% price cut) to the sales units (4-fold increase). This relationship is referred to as the "demand parameter" associated with the demand variable.

In this example, the demand parameter may be determined to specify that for every 25% price reduction, sales of a particular retail item will increase by 2-fold. With the demand parameter determined, it is then possible to forecast sales units by specifying the future values of the demand variables. To continue the price cut example, the retailer might know that next season it will be running a 40% price cut during some weeks. The demand model will then forecast sales units for those weeks accounting for the 40% price cut.

The demand parameter is determined by examining historical retail sales data (known as "retail panel data") containing price cuts for the retail item itself, or for similar retail items. However, as noted above, several demand variables affect the sales of retail items. These several demand variables apply simultaneously. For example, a retailer may have performed the 50% price cut during the summer for a summer item, in which case the 4-fold increase in sales may be partially due to an increase in seasonal demand for summer retail items during summer. To separate the effects of the several demand variables on sales, a regression is performed on the demand model to determine values for demand parameters that cause the demand model to best fit retail panel data.

Further, the quality of a sales forecast is very dependent on the quality of the input data (i.e., garbage in, garbage out). In many situations, the historical data necessary and available for sales forecasting is less than adequate, and the resulting forecasts can do more harm than good. Some known sophisticated forecasting solutions offer an exception driven workflow, where such bad forecasts are detected and a forecast analyst is prompted to review and adjust the forecast manually. Less sophisticated solutions do not catch the bad numbers, which can result in over/understock, wrong allocations, bad plans, etc.

SUMMARY

Embodiments predict future demand for a first product by receiving historical sales data for an aggregate products/locations level, the historical sales data including a plurality of sales data points, including sales data points for the first product at each of a plurality of locations. Embodiments extract a plurality of different types of features related to sales of each of the products and generate a plurality of clusters of sales data points based on the plurality of different types of features. Embodiments train each of the clusters to generate a plurality of trained cluster models including promotion effects per cluster. For a particular time period, a particular location and the first product, embodiment identify the features for the time period and map to one of the trained cluster models to fetch the promotion effects for the time period. Embodiments then use the promotion effects to forecast demand for the first product.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments estimate promotion effects/features using pooled sales data points at aggregated levels and auto clustering the data points. Each of the multiple cluster models are trained using regression and each saved cluster trained model is then used to predict demand for retail products/items.

As discussed above, in the retail industry, retailers need to predict future demand to better manage their inventory or promotion/markdown planning. To accurately forecast demand, retailers consider all factors that could impact the demand such as promotions, price change, seasonality, weather and so on. Known solutions for retailers have used various algorithms to estimate the promotion or price effects.

Further, in general single product/location combinations do not have enough sales observations to produce robust effects estimation. To account for this, a large number of observations pooled from across different products/locations/periods are typically used to estimate the effects. They are then used to forecast demand for the products/locations that were pooled during estimation phase. Typically, known solutions pool the data based on information related to the product and location hierarchies (e.g., pooling the data within same subclass and region). Then, during forecasting, the promotion effects will be the same for the entire forecast horizon, and also the same for all the products and locations which participated in the estimation.

However, these known solutions ignore at least two facts: (1) Every product/location is affected differently by the same promotion. For example, a low sales product would be affected differently than a high sales product, or different store formats would be affected differently; (2) The customer responds differently to the same event depending on the time of year. In other words, the effects of promotions are time-sensitive. For example, an ice cream promotion would be more effective during a hot summer as opposed to during a cold winter.

In contrast, embodiments use machine learning and auto clustering to estimate the impact of promotions on demand by taking into account the timing of an event, as well as the details of every product/location during estimation with pooled data. The details and timing, collectively, are referred to as "features". Examples of features include base sales, price, seasonality, brand, promotions, size, color, pack size, supplier, length, etc. While features such as price and seasonality may be relevant for all types of products, some others are item specific. For example, pack size impacts the demand for yogurts, however the length of the pack is insignificant. Conversely, the brand is very important for fashion items, but is much less important for hardware items, such as nails or hammers.

The term "item" or "retail item", as used herein, refers to merchandise sold, purchased, and/or returned in a sales environment. The terms "particular item" and "single item" are used interchangeably herein and refer to a particular item type (e.g., to a particular type of cellular telephone such as an iPhone 8), not to a unit item.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "sales channel" or "location" or "retail location", as used herein, may refer to a physical store where an item is sold, or to an online store via which an item is sold.

The term "sales data", as used herein, refers to historical sales and promotion information that has been recorded for an item that has been sold in past retail periods (e.g., over 52 weeks of the past year). Sales data may include, for example, a number of units (or a monetary amount) of an item sold in each retail period, along with data characterizing one or more types of promotions for the item. Sales data may be stored in a database, for example.

The terms "promotion" and "sales promotion" are used interchangeably herein and refer to a particular type of promotion for an item. Some examples of promotion components may include a price discount promotion component, a television advertisement component, a radio advertisement component, a newspaper advertisement component, an internet advertisement component, an email advertisement component, and an in-store advertisement component.

The term "promotion effect" refer to a numerical value that characterizes the effect (e.g., the effect on sales and profitability) of promoting an item. For example, an estimated promotion effect of 2.0 may indicate that a promotion, or combination or promotions, is estimated to result in twice as many sales (a 100% increase) for an item. Promotion effects (i.e., values) may be used in a demand forecast model to forecast a demand for an item. Promotion effects may also be used in a computerized inventory system to control various aspects of inventory for an item.

Embodiments, in general, utilize the following demand model or function for demand forecasting ("equation (1)"):

$$\text{Demand} = \text{base demand} * \text{seasonality} * \text{promo effects} \\ (*\text{additional features effects}) \quad (1)$$

Where "base demand" is the historical demand without taking account any effects or other factors, seasonality is the impact on demand based on the season (i.e., time of year), and promo effects are the effects on demand based on one or more promotions offered during a time period. Any or all additional features/variables that impact demand can be added to the model as appropriate. However, the number of features could exceed 100 in some situations.

Figure 1:
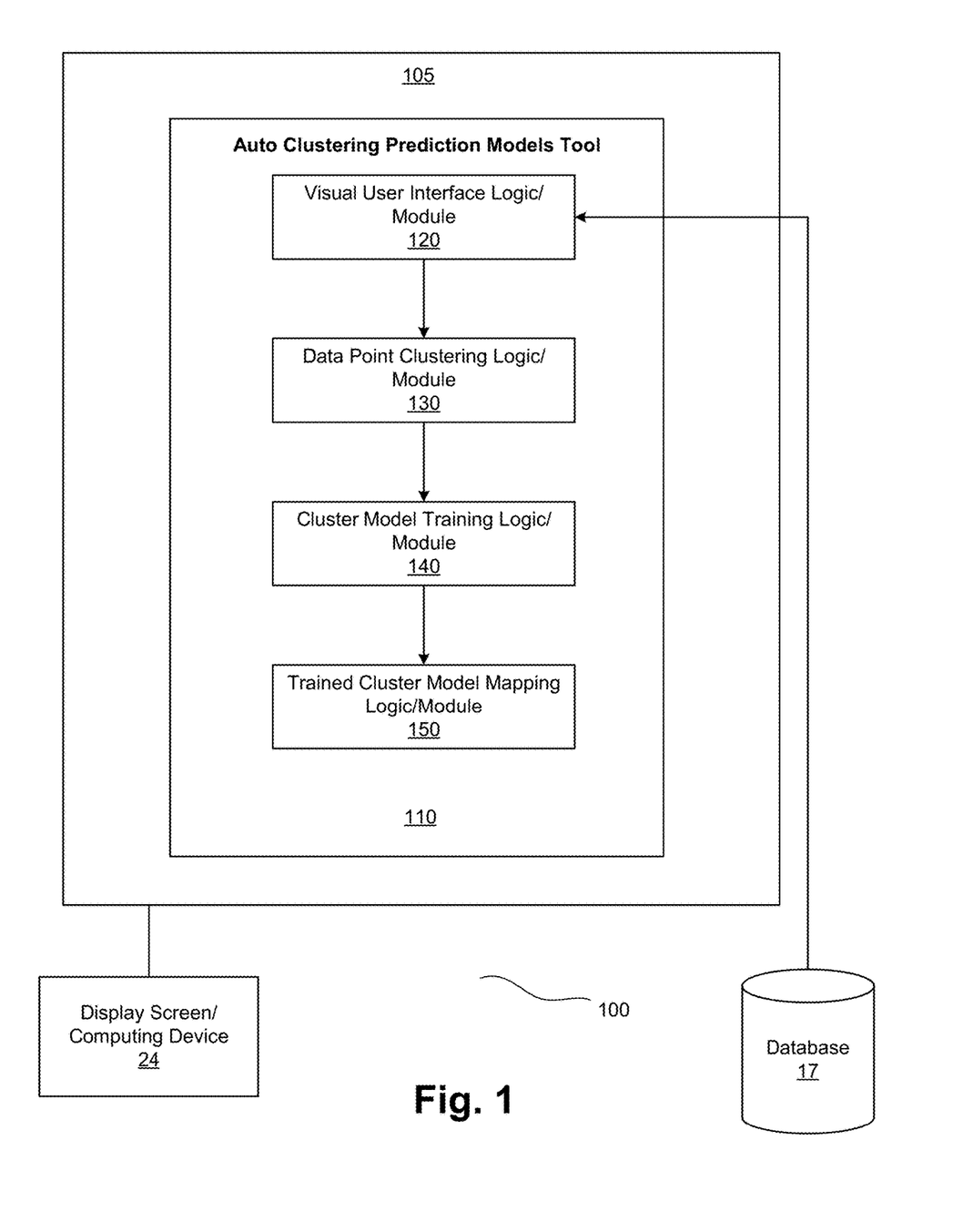
FIG. 1 illustrates a computer system having a computing device configured with an auto clustering prediction models tool in accordance to embodiments.

FIG. 1 illustrates a computer system 100 having a computing device 105 configured with an auto clustering prediction models tool 110 in accordance to embodiments. In one embodiment, auto clustering prediction models tool 110 may be part of a larger computer application (e.g., a computerized inventory management and demand forecasting application), configured to forecast and manage sales, promotions, and inventory for retail items at various retail locations. Auto clustering prediction models tool 110 is configured to computerize the process of analyzing sales data to generate trained cluster models that may be used by a demand model to forecast demand for items.

In one embodiment, system 100 is a computing/data processing system including an application or collection of distributed applications for enterprise organizations. The applications and computing system 100 may be configured to operate with or be implemented as a cloud-based networking system, a software-as-a-service ("SaaS") architecture, or other type of computing solution.

In one embodiment, a computer algorithm is disclosed that implements an analytical approach to determining the impact of promotions and features on demand for an item, or a class of items, at a store, or at multiple stores. It is assumed herein that sales data is available for use and that a demand model is defined which can be used for with auto clustered trained models from the sales data.

The forecast is an important driver of the supply chain. If a forecast is inaccurate, allocation and replenishment perform poorly, resulting in financial loss for the retailer. Improvements in forecast accuracy for promoted items may be achieved by the embodiments disclosed herein. Further, a better understanding of the impact a promotion has on demand may be achieved. This helps the retailer to more effectively plan promotions with respect to channel, pricing, and customer segments, for example.

In one embodiment, auto clustering prediction models tool 110 is implemented on computing device 105 and includes logics or modules for implementing various functional aspects of auto clustering prediction models tool 110. In one embodiment, auto clustering prediction models tool 110 includes visual user interface logic/module 120, data point clustering logic/module 130, cluster model training logic/module 140, and trained cluster model mapping logic/module 150.

Other embodiments may provide different logics or combinations of logics that provide the same or similar functionality as the auto clustering prediction models tool 110 of FIG. 1. In one embodiment, auto clustering prediction models tool 110 is an executable application including algorithms and/or program modules configured to perform the functions of the logics. The application is stored in a non-transitory computer storage medium. In one embodiment, the logics of auto clustering prediction models tool 110 are implemented as modules of instructions stored on a computer-readable medium.

Computer system 100 also includes a display screen 24 operably connected to computing device 105. In accordance with one embodiment, display screen 24 is implemented to display views of and facilitate user interaction with a graphical user interface ("GUI") generated by visual user interface logic 120 for viewing and updating information associated with generating promotion effect values (e.g., profitability estimates and demand forecasts). The graphical user interface may be associated with a promotion effects application and visual user interface logic 120 may be configured to generate the graphical user interface.

In one embodiment, computer system 100 is a centralized server-side application that provides at least the functions disclosed herein and that is accessed by many users via computing devices/terminals communicating with the computer system 100 (functioning as the server) over a computer network. Therefore, display screen 24 may represent multiple computing devices/terminals that allow users to access and receive services from auto clustering prediction models tool 110 via networked computer communications.

In one embodiment, computer system 100 further includes at least one database 17 operably connected to computing device 105 and/or a network interface to access database 17 via a network connection. For example, in one embodiment, database 17 is operably connected to visual user interface logic 120. In accordance with one embodiment, database 17 is configured to store and manage data structures (e.g., records of sales data) associated with auto clustering prediction models tool 110 in a database system (e.g., a computerized inventory management and demand forecasting application).

In one embodiment, visual user interface logic 120 is configured to generate a graphical user interface ("GUI") to facilitate user interaction with auto clustering prediction models tool 110. For example, visual user interface logic 120 includes program code that generates and causes the graphical user interface to be displayed based on an implemented graphical design of the interface. In response to user actions and selections via the GUI, associated aspects of generating promotion effect values and feature extraction for retail items may be manipulated.

For example, in one embodiment, visual user interface logic 120 is configured to facilitate receiving inputs and reading data in response to user actions. For example, visual user interface logic 120 may facilitate selection, reading, and inputting of sales data (promotion information and unit sales data or monetary sales data) associated with retail items sold at retail locations. The sales data may reside in at least one data structure (e.g., within database 17) associated with (and accessible by) an auto clustering and model training application (e.g., auto clustering prediction models tool 110) via the graphical user interface.

Sales data may include, for example, data representing past sales and promotions of an item across a plurality of past retail periods. The sales data may be segmented into retail periods of past weeks, with each past week having numerical values assigned to it to indicate the number of items sold (or monetary amount acquired for items) for that week. The sales data may also include numerical values representing price discounts and values of other promotion components across the retail periods, in accordance with one embodiment. The sales data for an item may be accessed via network communications, in accordance with one embodiment.

Further, visual user interface logic 120 is configured to facilitate the outputting and displaying of promotion effect values, via the graphical user interface, on display screen 24. In one embodiment, data point clustering logic 130 is configured to perform auto clustering of sales data points into "N" clusters using promotion effects and features related to the sales.

In one embodiment, cluster model training logic 140 is configured to train each of the clusters from data point clustering logic 130. In one embodiment, each cluster is trained using a regression algorithm, and each trained cluster model is saved in binary form in database 17. In one embodiment, trained cluster model mapping logic 150, in order to generate a forecast of demand based on promotion effects and feature, uses a selected saved cluster train model and map it to one of the N clusters. The corresponding N set of promotion/price effects is used to form a prediction of a final forecast of sales that includes the impact of promotions on demand that takes into account the time sensitivity of promotion effects and incorporates features so that the details of very product/location is also taken into account.

In one embodiment, the generated prediction of demand for an amount of inventory (e.g., for an item at a single store) is then used for orders to a computerized inventory system (e.g., by a computerized inventory management and demand forecasting system). The prediction of demand may also control an amount of inventory (e.g., for an item at a single store) to be allocated by the computerized inventory system. The prediction of demand may further control adjustment of an amount inventory (e.g., for an item at a single store) by the computerized inventory system.

In this manner, auto clustering prediction models tool 110 is configured to generate promotion effect values that better represent actual effects of a sales promotion of the retail item caused by or due to the sales promotion and can be used to predict demand.

Figure 2:
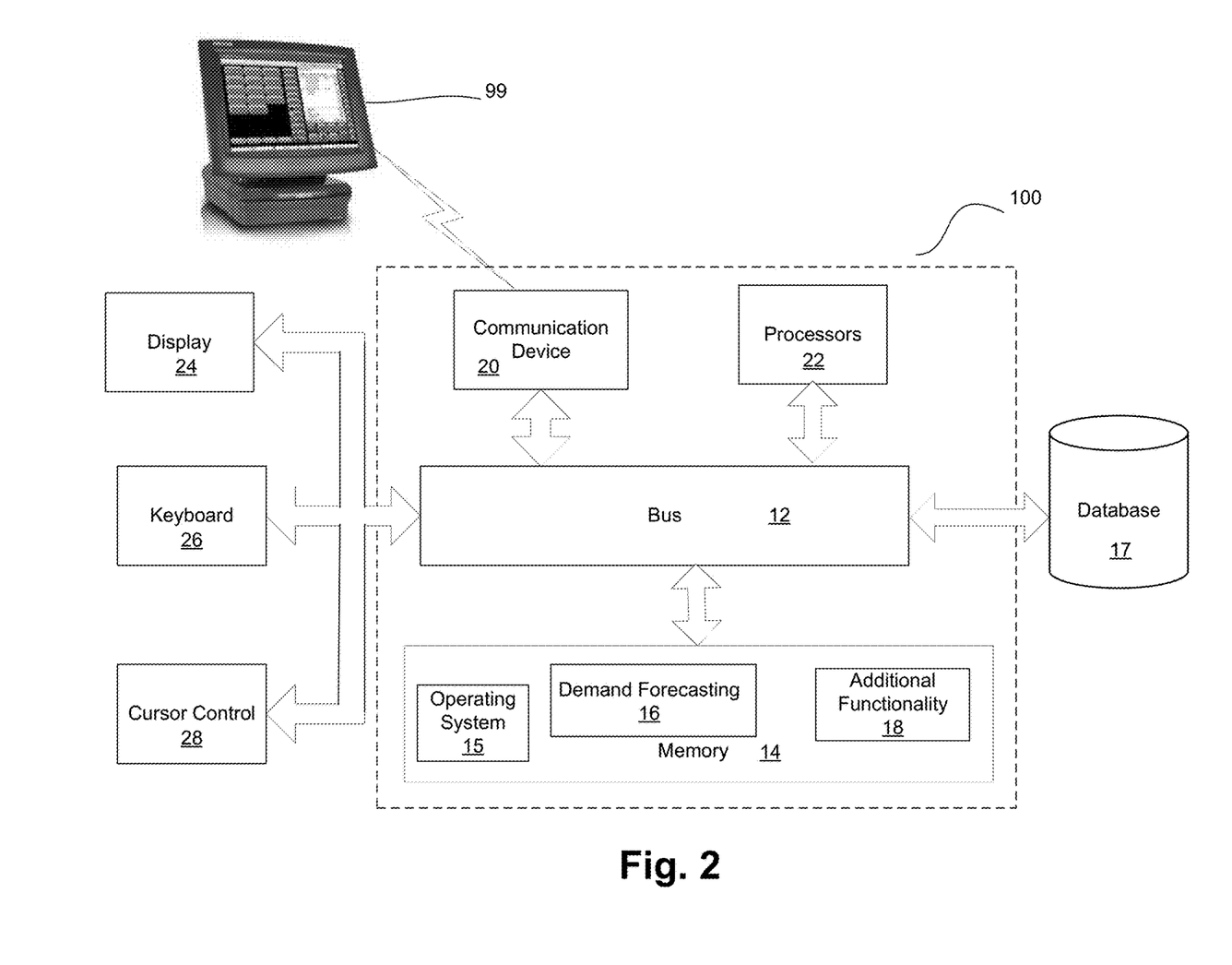
FIG. 2 is a block diagram of computer server/system in accordance with an embodiment of the present invention.

FIG. 2 is a block diagram of computer server/system 100 in accordance with an embodiment of the present invention. FIG. 2 illustrates further hardware/software details of system 100. Although shown as a single system, the functionality of system 10 can be implemented as a distributed system. Further, the functionality disclosed herein can be implemented on separate servers or devices that may be coupled together over a network. Further, one or more components of system 100 may not be included. For example, for functionality of a server, system 100 may need to include a processor and memory, but may not include one or more of the other components shown in FIG. 2, such as a keyboard or display.

System 100 includes a bus 12 or other communication mechanism for communicating information, and a processor 22 coupled to bus 12 for processing information. Processor 22 may be any type of general or specific purpose processor. System 100 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 100 further includes a communication device 20, such as a network interface card, to provide access to a network. Therefore, a user may interface with system 100 directly, or remotely through a network, or any other method. Some or all of the components of system 100 can implement the entirety Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to display 24, such as a Liquid Crystal Display ("LCD"). A keyboard 26 and a cursor control device 28, such as a computer mouse, are further coupled to bus 12 to enable a user to interface with system 100.

In one embodiment, memory 14 stores software modules that provide functionality when executed by processor 22. The modules include an operating system 15 that provides operating system functionality for system 100. The modules further include a demand forecasting module 16 that implements one or more of modules 120, 130, 140, 150, and all other functionality disclosed herein. System 100 can be part of a larger system. Therefore, system 100 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") or other type of inventory management system. Database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 99 generates the transactional data and historical sales data (e.g., data concerning transactions of each item/SKU (stock-keeping unit) at each retail store) used to forecast demand. POS terminal 99 itself can include additional processing functionality to forecast demand in accordance with one embodiment and can operate as a specialized demand forecasting system either by itself or in conjunction with other components of FIG. 2.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 100 is a computing/data processing system including an application or collection of distributed applications for enterprise organizations, and may also implement logistics, manufacturing, and inventory management functionality. The applications and computing system 100 may be configured to operate with or be implemented as a cloud-based networking system, a software-as-a-service ("SaaS") architecture, or other type of computing solution.

Embodiments are disclosed from the perspective that, for an item (i.e., a class of items such as yogurt or men's shirts or an individual SKU) sold at a location (e.g., a retail location), the item may be promoted in various ways at various times (i.e., pre-defined retail periods, such as a day, week, month, year, etc.). A retail calendar has many retail periods (e.g., weeks) that are organized in a particular manner (e.g., four (4) thirteen (13) week quarters) over a typical calendar year. A retail period may occur in the past or in the future. Historical sales/performance data may include, for example, a number of units of an item sold in each of a plurality of past retail periods as well as associated promotion data (i.e., for each retail period, which promotions were in effect for that period) and any other relevant demand features/variables.

Embodiments estimate promotion effects at aggregated levels with pooling all the data together. The resulting effects are product/location specific and time-sensitive, meaning they can change depending on the time period an event occurs. In general, in embodiments, promotion effects are estimated with pooling data at aggregated levels and different product/location/time are automatically grouped into clusters. The promotion effects are dynamically fetched during the forecast phase, based on the product/location and time-related features. Even for new product/location combinations, with no historical demand, embodiments are able to generate time-sensitive promotion effects.

Figure 3:
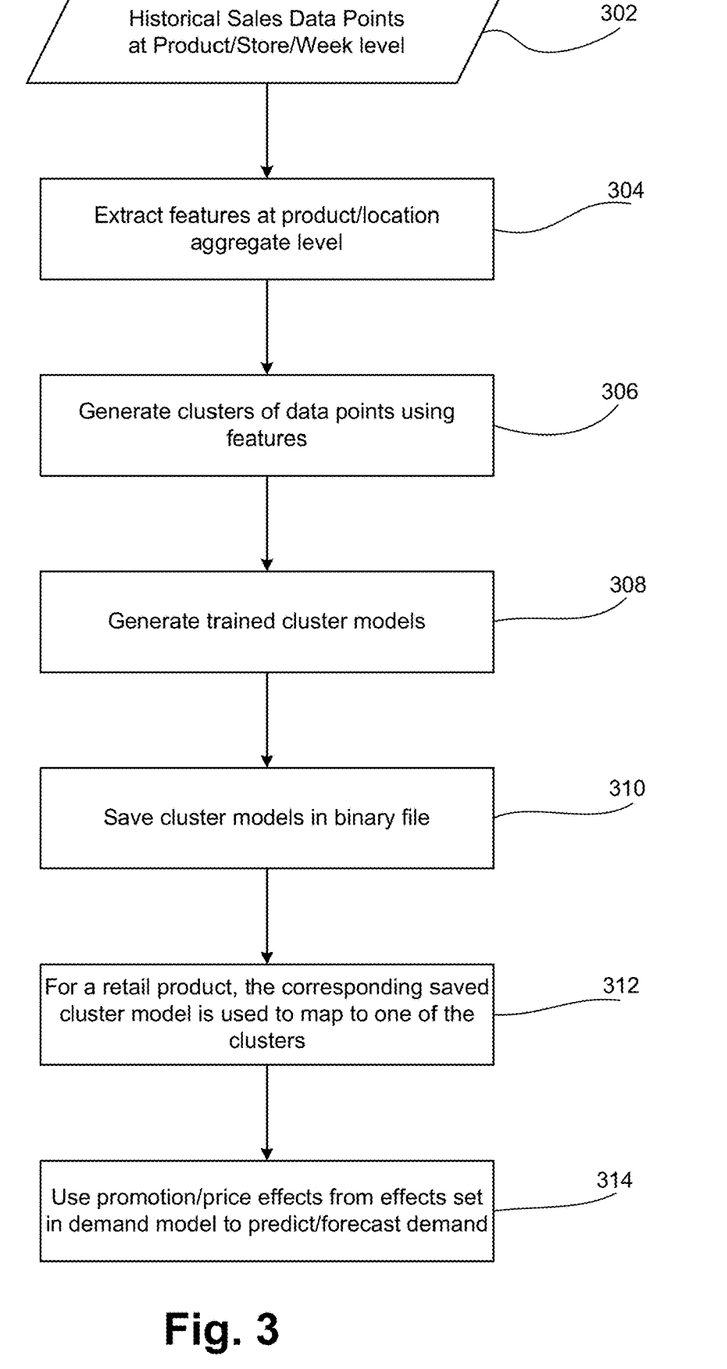
FIG. 3 is a flow diagram of the functionality of auto clustering prediction models tool of FIG. 1 when estimating promotional effects that can be used for a demand forecast in accordance with one embodiment.

FIG. 3 is a flow diagram of the functionality of auto clustering prediction models tool 110 of FIG. 1 when estimating promotional effects that can be used for a demand forecast in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, historical item sales data is received for all items/SKUs for all stores, for a particular class/category of products, or for only a single item of interest. For example, the class/category can be "yogurt", "coffee" or "milk." Each class has one or more subclasses, all the way down to the SKU or Universal Product Code ("UPC") level, which would be each individual item for sale. For example, for the class of yogurt, a sub-class could be each brand of yogurt, and further sub-classes could be flavor, size, type (e.g., Greek or regular), down to an SKU which would correspond to every individual different type of yogurt item sold.

Historical sales and performance data may include, for example, data representing past sales and promotions of each item across a plurality of past retail sales periods. The historical performance data may be segmented into retail periods of past weeks, with each past week having numerical values assigned to it to indicate the number of items sold for that week. The historical performance data may also include numerical values representing price discounts and values of other promotion components across the retail periods, in accordance with one embodiment. The historical performance data for an item may be accessed via network communications, in accordance with one embodiment, including being accessed from each POS terminal 99 at each retail store and/or accessed from database 17.

The historical performance data includes sales data associated with the plurality of promotion components across a plurality of time periods (e.g., weeks). Examples of promotion components include, but are not limited to, a price discount component, a television advertisement component, a radio advertisement component, a newspaper advertisement component, an email advertisement component, an internet advertisement component, and an in-store advertisement component. The historical data includes, for each item, a listing of feature/variables/attributes for the item, such as price, promotions, seasonality, brand, color, style, etc.

The historical sales data is received as multiple data points or a "data set", with a single data point for each sales of an item per store (i.e., at the product/store/week level in embodiments where "week" is the desired time period). In embodiments, the data points can be received by electronically parsing data generated by all POSs 99 at all relevant retail stores.

At 304, at an aggregate product/location (store) level, different types of features are extracted. Many of the features are extracted from non-sales related data, such as from ERP, merchandising systems and inventory management systems associated with the relevant stores. Some of the features (e.g., sales data, promotions in place during the sales period) are extracted from the sales data of 302. The extracted types of features in embodiments include the following:

a. Product related features $p_1 \ldots p_n$ (e.g., national brand vs. private label, package size, low sales vs. high volume, unit of measures ("UOM"), etc.);

b. Store features $s_1 \ldots s_m$ (e.g., convenience store vs. supermarket, population dense area vs. non population area, different store layouts, etc.);

c. Timing related features $t_1 \ldots t_k$ (e.g., holiday season vs. non holiday season, hot day vs cold day, low store traffic vs. high store traffic, football season, etc.);

d. Promotions and prices $x_1 \ldots x_j$.

At 306, embodiments generate "N" clusters of the data points from 302 using the product features ($p_1 \ldots p_n$), location features ($s_1 \ldots s_m$) and timing features ($t_1 \ldots t_k$) from 304 to generate N clusters ($c_1 \ldots c_N$). The number of clusters N can be a user defined number. Clustering is a form of data mining in which a set of objects (i.e., the features) are grouped in such a way that objects in the same group (the cluster) are more similar in some sense to each other than to those in other groups (clusters). In one embodiment, the k-means clustering algorithm is used. k-means clustering aims to partition n observations into k clusters in which each observation belongs to the cluster with the nearest mean, serving as a prototype of the cluster. However, other clustering algorithms such as hierarchical clustering, etc., can also be used.

In one embodiment, the following k-means clustering algorithm is used: Given an initial set of k means $m_1^{(1)}, \ldots, m_k^{(1)}$, the algorithm proceeds by alternating between two steps:

(1) Assignment step: Assign each observation to the cluster with the nearest mean: that with the least squared Euclidean distance. (Mathematically, this means partitioning the observations according to the Voronoi diagram generated by the means.)

$$S_i^{(t)} = \{x_p : \|x_p - m_i^{(t)}\|^2 \leq \|x_p - m_j^{(t)}\|^2 \forall j,\ 1 \leq j \leq k\},$$

where each $x_p$ is assigned to exactly one S(t), even if it could be assigned to two or more of them.

(2) Update step: Recalculate means (centroids) for observations assigned to each cluster.

$$m_i^{(t+1)} = \frac{1}{|S_i^{(t)}|} \sum_{x_j \in S_i^{(t)}} x_j$$

The algorithm has converged when the assignments no longer change.

At 308, each of the clusters generated at 306 are trained (i.e., estimating the effects) to generate trained cluster models (i.e., promotion effects per cluster generated at 306). In one embodiments, the training is done by running a regression for each cluster i of the N clusters and generate N sets of promotion/price effects $(e_1 \ldots e_k)_1 \ldots (e_1 \ldots e_k)_N$. In one embodiment, linear regression is used for the training, or estimating the effects, but other regression algorithms can be used. Each set of promotion/price effects is an optimized set of effects for the features of the corresponding cluster. The features in each cluster can be decomposed into product/location/time period. Every product/location/time period maps to one of the N sets of effects.

At 310, the clustering models are saved into a binary file that can easily be loaded on demand. For example, in embodiments, the models are trained with features in a machine learning specific language, such as Python or C++. These models can be saved into a binary file with a specific serialization format. For example, a model trained in Python can be saved to a python pickle binary file.

At 312, when a demand forecast for a retail product is desired, for each product/location/week, the saved cluster trained model is used to map it to one of the N clusters by identifying the features for the particular week. For example, for cluster i, promotion/price effect from effects set $(e_1 \ldots e_k)_i$ is fetched.

At 314, the promotion/price effects from 312 are used to predict a final demand. In one embodiment, the following demand forecast algorithm is used to predict demand:

demand=base demand*promotion lift*price lift. This is a relatively simple demand algorithm and much more complex demand forecast algorithms can be used in other embodiments as long as they incorporate the promotion effects in the demand forecast in any way. Embodiments can forecast demand on a per SKU/store basis, or forecast demand for all SKUs in all stores at the same time using a large matrix (i.e., each row is one SKU/store).

Figure 4A:
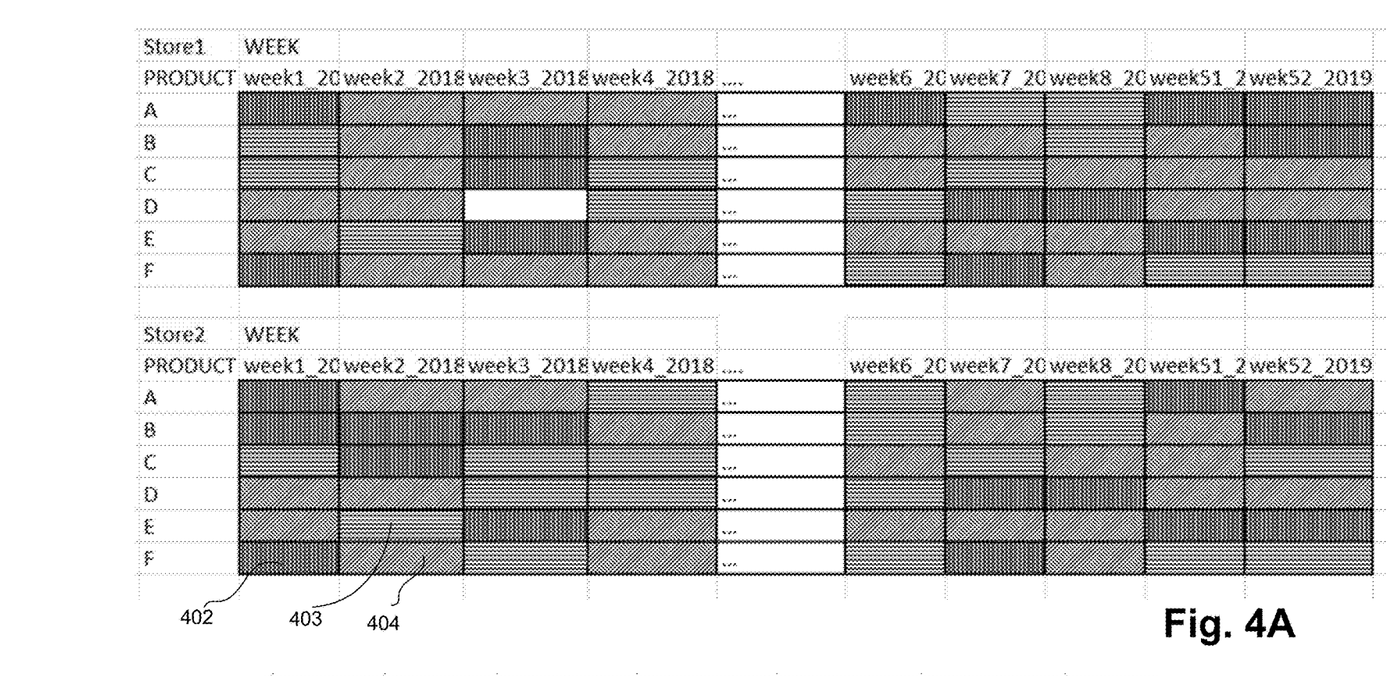
FIGS. 4A-B and 5 illustrate an example of an implementation of embodiments of the invention, and how each example corresponds to the functionality of FIG. 3.
Figure 4B:
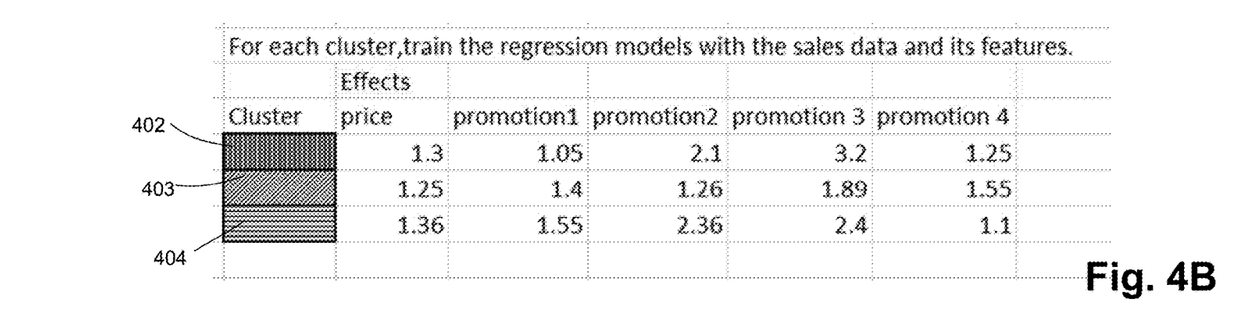
Figure 5:
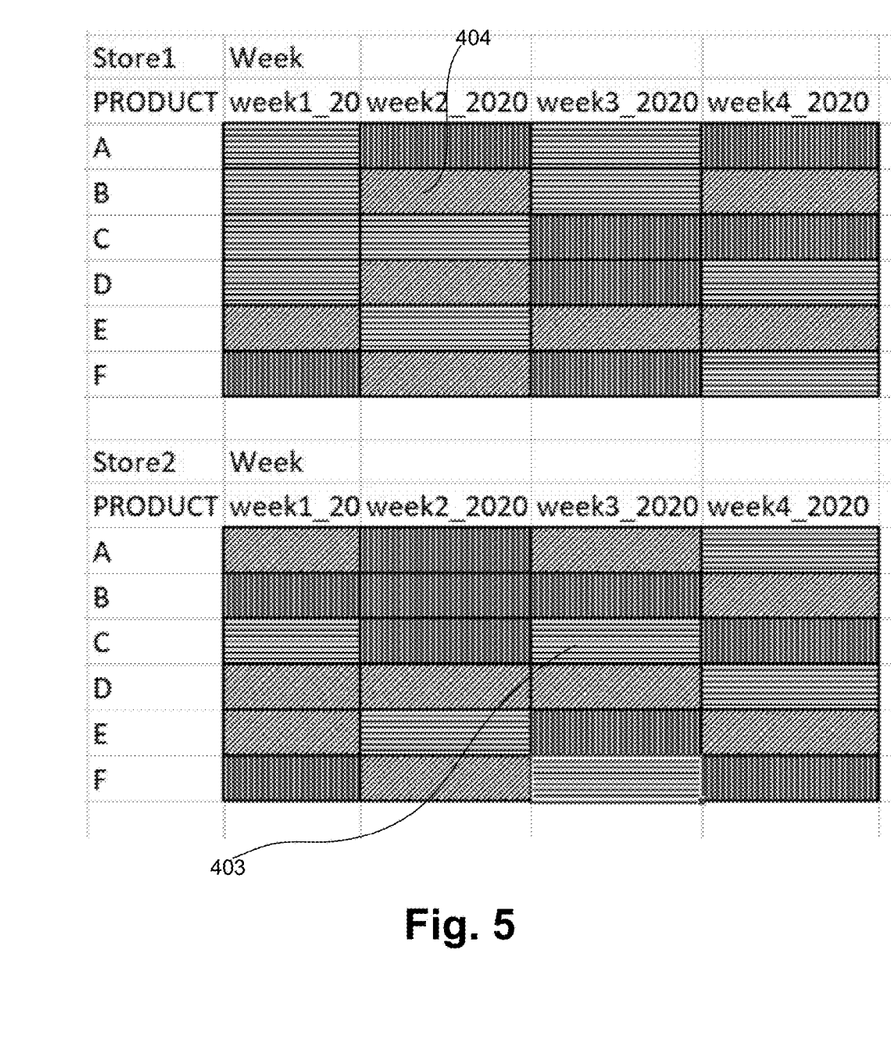

FIGS. 4A-B and 5 illustrate an example of an implementation of embodiments of the invention, and how each example corresponds to the functionality of FIG. 3. In the relatively simplified example, it is assumed that the retailers use the following formula to model demand:

demand=base demand*promotion lift*price lift;

and, for simplicity, it is assumed that the base demand is 5 for all product/store combinations.

At 302, historical sales data points are received. In the simplified example, it is assumed that there are two stores and information regarding 6 products from week1_2018 to week52_2019 (i.e., every week in 2018 and 2019).

At 304, embodiments associate every item/store/week sales data received at 302 with product, location, and time period related extracted features, including the following: product brand, package size, store type, weather during the corresponding week, what sporting events are on during the corresponding week, price, promotions 1, 2, 3, 4, etc.

At 306, the clustering algorithm is implemented to cluster the sales into N clusters (i.e., three clusters in this example). In FIG. 4A, each cluster (402, 403, 404) is denoted by a different cross-hatching scheme. The tables shown in FIG. 4A assign one of the three clusters to each product, at each store, during each of the weeks as a result of the clustering.

At 308, for each cluster 402-404, the regression models are trained with the sales data and its features by using data in each cluster to generate promotion effects per cluster 402-404. FIG. 4B shows for each of the clusters, the trained promotion effects for price and promotions 1-4. The generated effects at 308 are based on the effects that form the demand model (in this simplified example, only price and promotions). In more complicated demand models, effects generated can also include holidays, back-to-school events, weather, etc. Each effect number in FIG. 4B functions as a multiplier.

At 310, the trained clustering models and three trained regression models are saved in a binary file. The binary file can include both clustering models and regression models. FIG. 4A illustrates clustering models while FIG. 4B illustrates the regression models. In embodiments, clustering and regression could be done separately and then saved to different binary files or a single file.

At 312, to create the forecast for week1_2020 to week4_2020 (i.e., the first 4 weeks of 2020), the features of those weeks are first identified. Then the saved cluster model is used to predict every item/store/week to one of the three clusters. FIG. 5 illustrates how embodiments map each product/location/week to a cluster. So, for example, Store1, Product B, week 2 is mapped to cluster 404, while Store2, Product C, Week 3 is mapped to cluster 403.

At 314, for each item/store/week, the effects (price, promotions) in the corresponding cluster are applied on top of the base demand, using the demand formula, to create the forecast. Specifically, for this example, where demand=base demand*promotion lift*price lift, assume base demand of product A in store 1 is 2.0, and promotion 1 & 3 is on during week2_2020, then the demand of week2_2020 of product A at store 1 is: Demand=2*1.05*3.2=6.72

Figure 6:
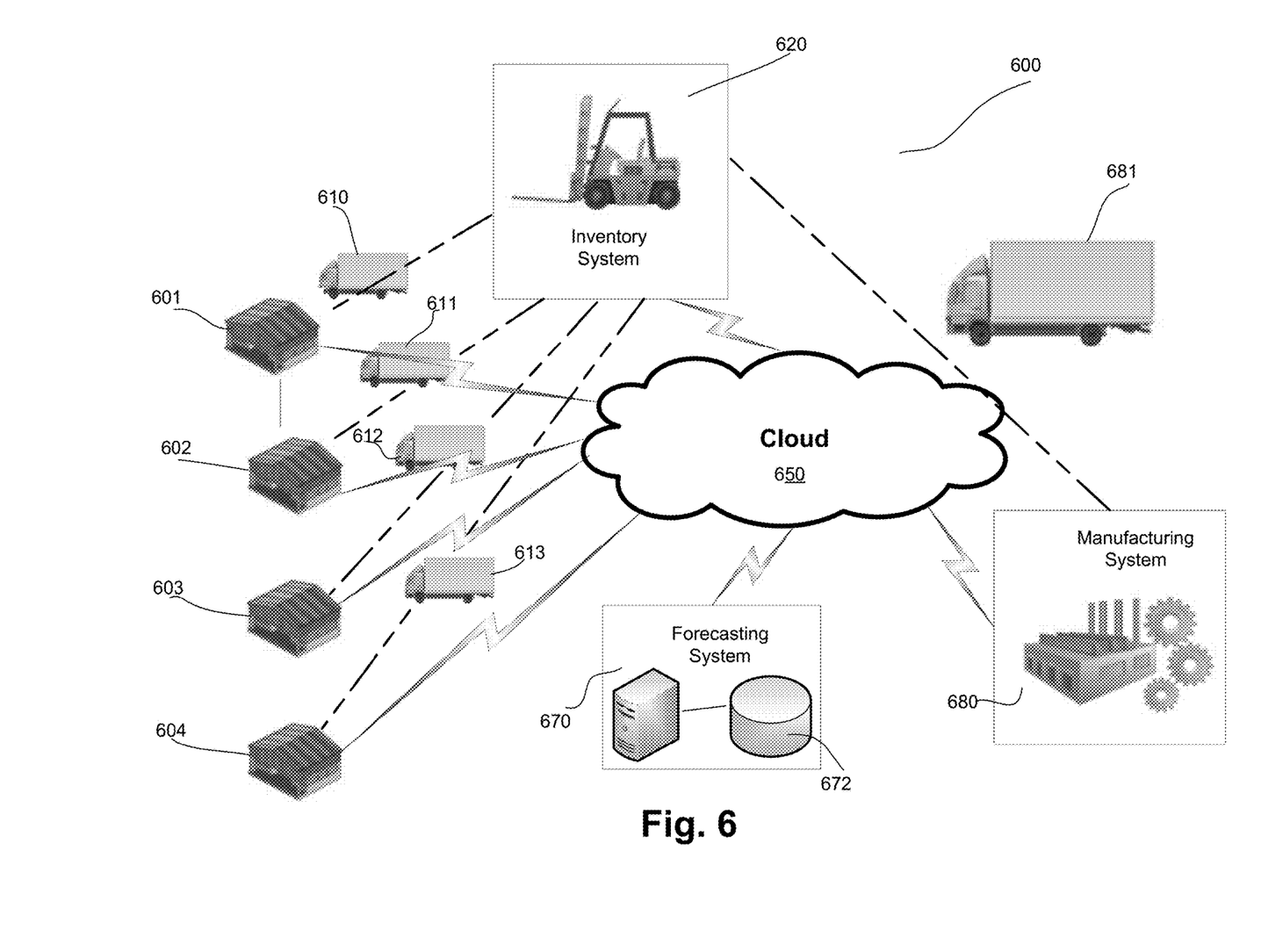
FIG. 6 illustrates an integrated manufacturing, inventory and logistics system that includes demand forecasting as disclosed herein in accordance with one embodiment.

FIG. 6 illustrates an integrated manufacturing, inventory and logistics system 600 that includes demand forecasting as disclosed herein in accordance with one embodiment. As shown in FIG. 6, system 600 can include a product demand forecasting system 670 that forecasts future product demand and in some instances forecasts and/or considers future demand for hundreds of thousands of products, or in some applications tens of millions or more products at one or more retail stores 601-604. Forecasting system 670 is in communication through a cloud network 650 or other type of communications network with one or more inventory systems 620 and one or more manufacturing systems 680.

Forecasting system 670 generates demand forecasting by implementing the functionality disclosed in conjunction with FIG. 3 above. Inventory system 620 stores inventory and provides transportation logistics to deliver items to stores 601-604 using trucks 610-613 or some other transportation mechanisms. Inventory system 620 in one embodiment implements an Enterprise Resource Planning ("ERP") specialized computer system or a specialized inventory control system that uses input from demand forecasting system 670 to determine levels of inventories and the amount and timing of the delivery of items to stores 601-604. The functionality of FIG. 6 can be completely automated in some embodiments using automated loading mechanisms and self-driving transportation.

Manufacturing system 680 manufactures items to be sent to inventory system 620 and provides transportation logistics to deliver the items to inventory system 620 using a truck 681 or some other transportation mechanisms. Manufacturing system 680 in one embodiment implements an ERP specialized computer system or a specialized manufacturing system that uses input from forecasting system 670 to determine an amount of items to manufacture, inventory of resources that are used for the manufacturing, and the amount and timing of the delivery of items to inventory system 620.

Forecasting system 670 can utilize information from inventory system 620, a sales tracking system (not shown) and/or databases in forecasting demand for products. In forecasting demand, forecasting system 670 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 6 perform sales, manufacturing, or consumption of inventory. Retail locations/stores 601-604 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 601-604 sends sales data and historic forecast data to forecasting system 670. The sales data includes inventory depletion statistics for each item, or SKU/UPC for each sales period, typically days, in the previous sales cycles (i.e. weeks), typically 4-7 weeks of inventory cycles.

Forecasting system 670 stores the sales data in a repository 672, and employs the sales data for generating orders to replenish inventory. The orders include a set of items and a quantity for each item for maintaining the inventory level at a store 601-604.

Many retail ordering schemes rely on days of the week for sales periods and sales cycles. In one configuration, in an inventory management environment having inventory statistics, in which the inventory statistics are specific to each day of the week, inventory system 620 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 99 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

As disclosed, embodiments estimate the impact of promotions on demand by taking into account the timing of an event, as well as the details/features of every product/location during estimation with pooled data. As a result, the demand forecast is more accurate, which prevents lost sales and unnecessary markdowns.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of predicting future demand for a first product, the method comprising:
   receiving historical sales data for an aggregate products/locations level, the historical sales data comprising a plurality of sales data points, including sales data points for the first product at each of a plurality of locations;
   extracting a plurality of different types of features related to sales of each of the products;
   generating, using auto clustering, a plurality of clusters of sales data points based on the plurality of different types of features, each of the plurality of clusters comprising a set of the features that are more similar to each other than different set of features corresponding to the other clusters, the auto clustering comprising data mining of the sales data points, wherein each cluster of the plurality of clusters comprises a corresponding mean, and the generating comprises: assigning each of the features to a respective cluster with a nearest mean, recalculating the means for features assigned to each cluster, and repeating the assigning and recalculating until assignments no longer change;
   training each of the clusters using the historical sales data to generate a plurality of trained cluster models comprising a set of promotion effects per cluster, the training comprising running a regression for each of the plurality of clusters;
   for a particular time period, a particular location and the first product, identifying the features for the time period and mapping to one of the trained cluster models to fetch the corresponding set of promotion effects for the time period; and
   using the corresponding set of promotion effects from the mapped trained cluster model to forecast demand for the first product, wherein the mapped trained cluster model predicts demand for the first product;

the method implemented by one or more processors executing instructions.

2. The method of claim 1, wherein the different types of features comprise one or more of product related features, store features, timing related features, or promotions.

3. The method of claim 1, wherein the plurality of clusters are generated using k-means clustering, and the assigning an initial set of k means $m_1^{(1)}, \ldots, m_k^{(1)}$ comprises:

$$S_i^{(t)}=\{x_p: \|x_p-m_i^{(t)}\|^2 \leq \|x_p-m_j^{(t)}\|^2 \forall j,\ 1 \leq j \leq k\},$$

where each $x_p$ is assigned to exactly one $S^{(t)}$, even if it could be assigned to two or more of them.

4. The method of claim 1, wherein the training each of the clusters comprises running a linear regression on each cluster.

5. The method of claim 1, further comprising saving each of trained cluster models into a binary file.

6. The method of claim 1, the using the promotion effect to forecast demand comprising: demand=base demand*promotion lift*price lift.

7. The method of claim 1, wherein the first product comprises a single stock-keeping unit (SKU) and the historical sales data comprises all SKUs sold at all locations for an entity.

8. The method of claim 1, further comprising:
in response to the determined forecasted demand for the first product, electronically sending the forecasted demand to an inventory management system;
at the inventory management system, based on the received forecasted demand, generating an electronic order to automatically generate shipments, via a transportation mechanism, of additional quantities of the first product to a plurality of retail stores.

9. A non-transitory computer-readable medium having instructions stored thereon that, when executed by a processor, cause the processor to predict future demand for a first product, the prediction comprising:
receiving historical sales data for an aggregate products/locations level, the historical sales data comprising a plurality of sales data points, including sales data points for the first product at each of a plurality of locations;
extracting a plurality of different types of features related to sales of each of the products;
generating, using auto clustering, a plurality of clusters of sales data points based on the plurality of different types of features, each of the plurality of clusters comprising a set of the features that are more similar to each other than different set of features corresponding to the other clusters, the auto clustering comprising data mining of the sales data points, wherein each cluster of the plurality of clusters comprises a corresponding mean, and the generating comprises: assigning each of the features to a respective cluster with a nearest mean, recalculating the means for features assigned to each cluster, and repeating the assigning and recalculating until assignments no longer change;
training each of the clusters using the historical sales data to generate a plurality of trained cluster models comprising a set of promotion effects per cluster, the training comprising running a regression for each of the plurality of clusters;
for a particular time period, a particular location and the first product, identifying the features for the time period and mapping to one of the trained cluster models to fetch the corresponding set of promotion effects for the time period; and
using the corresponding set of promotion effects from the mapped trained cluster model to forecast demand for the first product, wherein the mapped trained cluster model predicts demand for the first product.

10. The computer-readable medium of claim 9, wherein the different types of features comprise one or more of product related features, store features, timing related features, or promotions.

11. The computer-readable medium of claim 9, wherein the plurality of clusters are generated using k-means clustering, and the assigning an initial set of k means $m_1^{(1)}, \ldots, m_k^{(1)}$ comprises:

$$S_i^{(t)}=\{x_p: \|x_p-m_i^{(t)}\|^2 \leq \|x_p-m_j^{(t)}\|^2 \forall j,\ 1 \leq j \leq k\},$$

where each $x_p$ is assigned to exactly one $S^{(t)}$, even if it could be assigned to two or more of them.

12. The computer-readable medium of claim 9, wherein the training each of the clusters comprises running a linear regression on each cluster.

13. The computer-readable medium of claim 9, the predicting further comprising saving each of trained cluster models into a binary file.

14. The computer-readable medium of claim 9, the using the promotion effect to forecast demand comprising: demand=base demand*promotion lift*price lift.

15. The computer-readable medium of claim 9, wherein the first product comprises a single stock-keeping unit (SKU) and the historical sales data comprises all SKUs sold at all locations for an entity.

16. The computer-readable medium of claim 9, the predicting further comprising:
in response to the determined forecasted demand for the first product, electronically sending the forecasted demand to an inventory management system;
at the inventory management system, based on the received forecasted demand, generating an electronic order to automatically generate shipments, via a transportation mechanism, of additional quantities of the first product to a plurality of retail stores.

17. A product demand forecasting system for predicting future demand for a first product comprising:
one or more processors coupled to one or more point of sale systems, the processors receiving historical sales data for an aggregate products/locations level, the historical sales data comprising a plurality of sales data points, including sales data points for the first product at each of a plurality of locations;
the processors further adapted to:
extract a plurality of different types of features related to sales of each of the products;
generate, using auto clustering, a plurality of clusters of sales data points based on the plurality of different types of features, each of the plurality of clusters comprising a set of the features that are more similar to each other than different set of features corresponding to the other clusters, the auto clustering comprising data mining of the sales data points, wherein each cluster of the plurality of clusters comprises a corresponding mean, and the generating comprises: assigning each of the features to a respective cluster with a nearest mean, recalculating the means for features assigned to each cluster, and repeating the assigning and recalculating until assignments no longer change;
train each of the clusters using the historical sales data to generate a plurality of trained cluster models comprising a set of promotion effects per cluster, the training comprising running a regression for each of the plurality of clusters;

for a particular time period, a particular location and the first product, identify the features for the time period and map to one of the trained cluster models to fetch the corresponding set of promotion effects for the time period; and use the corresponding set of promotion effects from the mapped trained cluster model to forecast demand for the first product, wherein the mapped trained cluster model predicts demand for the first product.

18. The product demand forecasting system of claim 17, wherein the different types of features comprise one or more of product related features, store features, timing related features, or promotions.

19. The product demand forecasting system of claim 17, wherein the plurality of clusters are generated using k-means clustering, and the assigning an initial set of k means $m_1^{(1)}, \ldots, m_k^{(1)}$ comprises:

$$S_i^{(t)} = \{x_p : \|x_p - m_i^{(t)}\|^2 \leq \|x_p - m_j^{(t)}\|^2 \forall j,\ 1 \leq j \leq k\},$$

where each $x_p$ is assigned to exactly one $S^{(t)}$, even if it could be assigned to two or more of them.

20. The product demand forecasting system of claim 17, wherein the training each of the clusters comprises running a linear regression on each cluster.

* * * * *